United States Patent
Kawashima et al.

(10) Patent No.: US 10,013,696 B2
(45) Date of Patent: Jul. 3, 2018

(54) IDENTIFICATION INFORMATION SUPERVISING METHOD, PORTAL INFORMATION PROVIDING APPARATUS, AND IC CARD

(75) Inventors: Takashi Kawashima, Kanagawa (JP); Kotaro Hagiwara, Tokyo (JP); Hirofumi Hayaashi, Kanagawa (JP); Shinya Goishi, Tokyo (JP)

(73) Assignee: SONY CORPORATION, Tokyo (JP)

(*) Notice: Subject to any disclaimer, the term of this patent is extended or adjusted under 35 U.S.C. 154(b) by 681 days.

(21) Appl. No.: 10/432,710

(22) PCT Filed: Sep. 27, 2002

(86) PCT No.: PCT/JP02/10081
§ 371 (c)(1),
(2), (4) Date: May 27, 2003

(87) PCT Pub. No.: WO03/030046
PCT Pub. Date: Apr. 10, 2003

(65) Prior Publication Data
US 2004/0148186 A1    Jul. 29, 2004

(30) Foreign Application Priority Data
Sep. 28, 2001   (JP) .................... 2001-303565

(51) Int. Cl.
*G06Q 10/00* (2012.01)
*G06Q 30/02* (2012.01)
(Continued)

(52) U.S. Cl.
CPC ........... *G06Q 30/02* (2013.01); *G06Q 20/204* (2013.01); *G06Q 30/06* (2013.01)

(58) Field of Classification Search
USPC ........................................ 705/5–6
See application file for complete search history.

(56) References Cited

U.S. PATENT DOCUMENTS

| 4,736,094 A | 4/1988 | Yoshida |
| 5,578,808 A | 11/1996 | Taylor |

(Continued)

FOREIGN PATENT DOCUMENTS

| JP | 5 159114 | 6/1993 |
| JP | 2000-003334 | 1/2000 |

(Continued)

OTHER PUBLICATIONS

Chu S et al: "Product Selection for Web-based Single Sign-On Solutions" Information Security Bulletin, 2000, pp. 29-38, XP002252024.

(Continued)

*Primary Examiner* — Tonya Joseph
(74) *Attorney, Agent, or Firm* — Paratus Law Group, PLLC

(57) ABSTRACT

An identification information centralizing method capable of receiving services provided by a plurality of corporations by using a single item of identification information. Centralized ID information (162) for identifying a customer is assigned by a centralizing corporation. Individual ID information (168) which is uniquely assigned to identify the customer by a plurality of corporations which provide services to a pre-registered customer is registered in a database (160) in such a manner as to be associated with the centralized ID information (162), so that provision of services by a plurality of corporations is made possible by using the single item of centralized ID information (162).

9 Claims, 18 Drawing Sheets

(51) Int. Cl.
*G06Q 20/20* (2012.01)
*G06Q 30/06* (2012.01)

(56) References Cited

U.S. PATENT DOCUMENTS

| | | | |
|---|---|---|---|
| 5,590,038 A | 12/1996 | Pitroda | |
| 5,590,199 A | 12/1996 | Krajewski, Jr. et al. | |
| 6,105,011 A * | 8/2000 | Morrison, Jr. | 705/45 |
| 6,115,690 A * | 9/2000 | Wong | 705/7 |
| 6,789,078 B2 * | 9/2004 | Saitou et al. | 707/10 |
| 6,879,965 B2 * | 4/2005 | Fung et al. | 705/39 |
| 6,996,534 B2 * | 2/2006 | Hamaguchi et al. | 705/14 |
| 2001/0023892 A1* | 9/2001 | Hendrick | 235/380 |
| 2001/0027501 A1* | 10/2001 | O'Hare et al. | 710/107 |
| 2002/0095333 A1* | 7/2002 | Jokinen et al. | 705/14 |
| 2002/0128916 A1* | 9/2002 | Beinecke, III | 705/26 |
| 2002/0133429 A1* | 9/2002 | Lu | 705/27 |
| 2003/0041147 A1* | 2/2003 | van den Oord | G06F 17/276 709/227 |
| 2004/0107142 A1* | 6/2004 | Tomita et al. | 705/26 |

FOREIGN PATENT DOCUMENTS

| | | |
|---|---|---|
| JP | 2000-076337 | 3/2000 |
| JP | 2000-207334 | 7/2000 |
| JP | 2001236379 A * | 8/2001 |
| WO | WO 97/03404 | 1/1997 |

OTHER PUBLICATIONS

Office Action dated Nov. 9, 2009, from the Japanese Patent Office in related Japanese patent application No. 2002-0303565 (24 pages).

Office Action for Application No. 2001-303565, the Japanese Patent Office, dated Mar. 30, 2010.

* cited by examiner

FIG. 4

| CENTRALIZED ID | NAME | ADDRESS | POSTAL CODE NUMBER | MAIL ADDRESS | PHONE NUMBER | OTHER |
|---|---|---|---|---|---|---|
| XXXX0001 | TARO TOKKYO | SHINAGAWA-KU, ... TOKYO | 141-0001 | aaa@bbb.ccc | 03-1234-5678 | |
| ... | ... | ... | ... | ... | ... | ... |

| SERVICE ID | | NARROWING CODE | |
|---|---|---|---|
| FIRST ID | SECOND ID | FIRST AREA CODE | SECOND AREA CODE |
| AAAA0001 (GEN HIRAI) | BBBB0001 (TICKET BASED) | 01 (AROUND TOKYO) | 02 (AROUND OSAKA) |
| AAAA0001 (GEN HIRAI) | CCCC0001 (CD BASED) | 99 (WHOLE COUNTRY) | 99 (WHOLE COUNTRY) |
| AAAA0001 (GEN HIRAI) | DDDD0001 (ARTICLE BASED) | 01 (AROUND TOKYO) | 03 (AROUND NAGOYA) |
| ⋮ | ⋮ | ⋮ | ⋮ |

| AREA CODE | AREA |
|---|---|
| 01 | AROUND TOKYO |
| 02 | OSAKA/KINKI AREA |
| 03 | NAGOYA AREA |
| ⋮ | ⋮ |
| 99 | WHOLE COUNTRY |

ADDRESS / AREA CODE / AREA
POSTAL CODE NUMBER / AREA CODE / AREA
PHONE NUMBER

FIG. 8A

○ JOIN
○ INDIVIDUAL ID REGISTRATION
○ SERVICE REGISTRATION
○ LOG-IN
· · ·

PLEASE SELECT THE DESIRED ITEM.

FIG. 8B

NAME : TARO NIPPON
ADDRESS : SHINAGAWA-KU, TOKYO
PHONE NUMBER : 03-1234-5678
· · ·

PLEASE ENTER IN EACH ITEM AND CLICK THE TRANSMISSION BUTTON.

[TRANSMIT]

FIG. 8C

INDIVIDUAL ID : AAAA
· · ·

PLEASE ENTER IN EACH ITEM AND CLICK THE TRANSMISSION BUTTON.

[TRANSMIT]

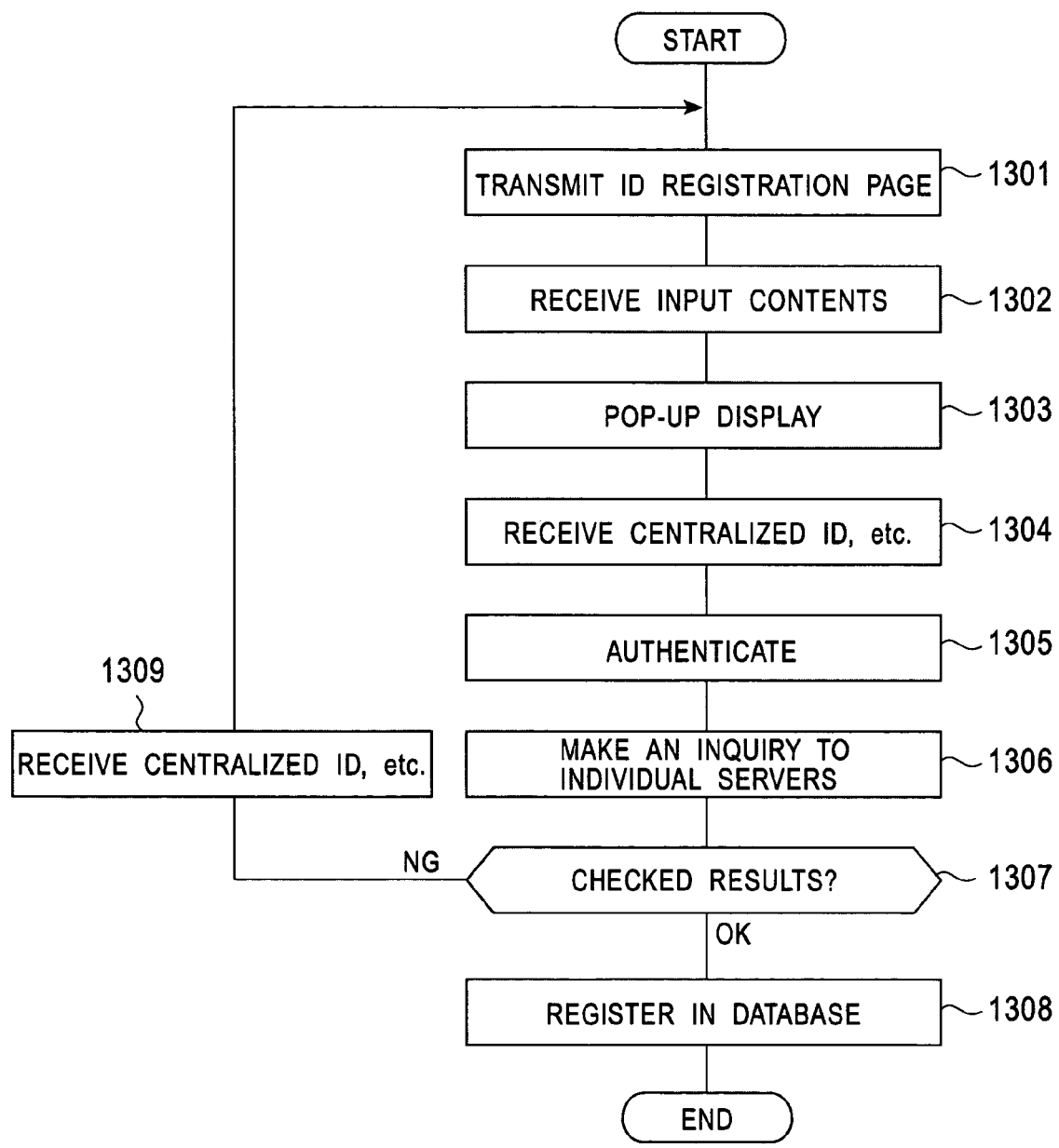

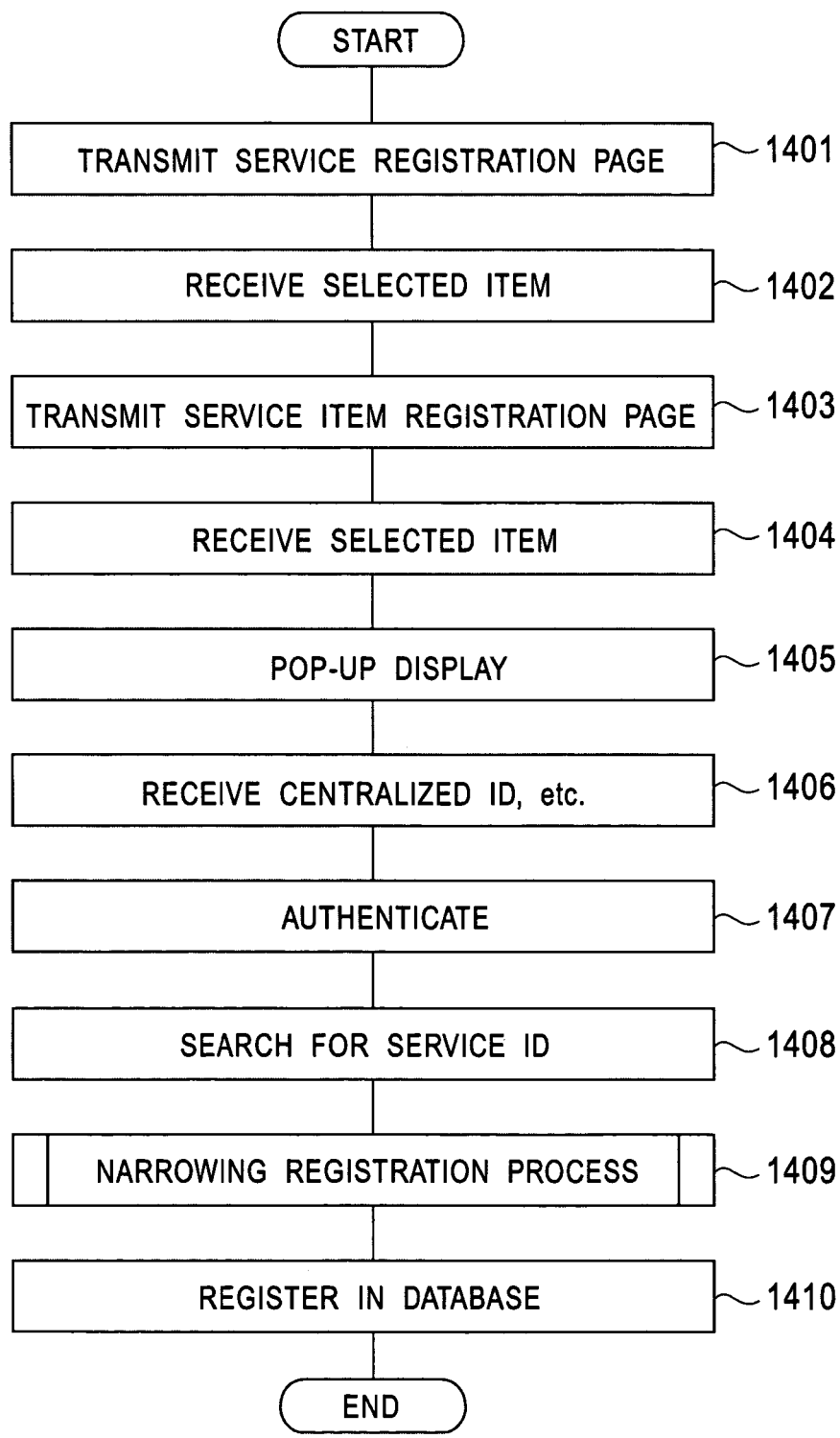

CARD INFORMATION

| CENTRALIZED ID | 0001-0002-0003 |
|---|---|
| UNIQUE ID | EM0123456789 |
| ISSUANCE DATE | 2000/12/24 |
| BALANCE | ¥ 25,000 |
| HISTORY OF RECEIPT OF MONEY | 2001/07/01/TERMINAL NUMBER:0001<br>2001/07/25/TERMINAL NUMBER:0003<br>... ... ... ...<br>... ... ... ... |
| HISTORY OF PAYMENT | 2001/08/20/TERMINAL NUMBER:0005<br>2001/09/03/TERMINAL NUMBER:0008<br>... ... ... ...<br>... ... ... ... |
| OTHER | ... ... ... ... |

IDENTIFICATION INFORMATION SUPERVISING METHOD, PORTAL INFORMATION PROVIDING APPARATUS, AND IC CARD

TECHNICAL FIELD

The present invention relates to an identification information centralizing method capable of using services provided by each of individual corporations on the basis of a single item of centralized identification information in which individual identification information assigned by each of a plurality of individual corporations to customers is centralized, a portal information providing apparatus for providing portal information to a customer via a network by using the identification information centralizing method, and an IC card used when services are provided using the identification information centralizing method.

BACKGROUND ART

In recent years, various corporations have been issuing various kinds of cards, such as credit cards, membership cards, point cards, debit cards, electronic-money cards, and cash cards. When these cards are to be issued, identification information for identifying a customer (user) from other customers is assigned, the identification information is displayed visually on the card according to the type of card, or the identification information is electronically or magnetically recorded on the card according to the type of card.

When receiving services, the customer shows a corresponding card or causes a terminal provided with a card reader to read a corresponding card, thereby receiving desired services. Since different cards are issued by each corporation to each user (customer), there are cases in which one person owns several to a little over 10 cards.

Furthermore, in recent years, a communication environment via a network such as the Internet has been growing remarkably, and so corporations that issue the above-described cards in order to provide various services, and other corporations have come to provide information provision, sales of goods, and other services. Each corporation identifies a customer in such a manner that the above-described identification information or separately assigned identification information is made to be input, for example, when making an access to a Web site managed by the corporation.

Furthermore, in the Internet, etc., in order to facilitate an access to various corporations or in order to obtain various types of information, a portal site is used. The "portal site" is a Web site which is produced for the purpose of being displayed first by the Web browser when connection to the Internet is made. In the portal site., for example, information, such as links to other sites, news, weather, and financial information, is displayed, and there are cases in which the portal site has a search function. Some of these portal sites are formed in such a manner that data items to be displayed and the layout thereof can be customized according to the preference of a user.

However, as described above, since several kinds of cards are issued to one customer by a plurality of corporations, there is a problem in that it is necessary for the customer to separately manage each card, and this is troublesome. From the point of view of decreasing the number of cards to as little as possible, there are cases in which several corporations cooperate with each other and issue joint cards. Although this is effective from the point of view of decreasing the number of cards, only one card merely has functions of several cards, and this is not sufficient.

In the Internet, etc., in a case where services are to be received from various corporations, it is necessary to access a Web site of the corporation in accordance with a link from a portal site or independently and to input the identification information assigned by that Web site. Therefore, there is a problem in that a plurality of items of identification information must be managed and the operation for inputting them is complicated.

Furthermore, in the Internet, etc., in a case where services which are related among corporations are to be received, for example, when, regarding a particular singer, new record information (including the purchase of music recordings) and concert information (including the purchase of tickets) are to be received and when these are provided by different corporations, it is necessary to make accesses separately and to receive the corresponding services. If both or more services can be received at one Web site, this is very convenient.

The present invention has been made in view of such points. An object of the present invention is to be capable of receiving the provision of services by a plurality of corporations by using a single card or a single item of identification information. Another object of the present invention is to be capable of receiving services, which are related to each other, provided by a plurality of corporations with simple operation.

DISCLOSURE OF THE INVENTION

[Identification Information Centralizing Method]

According to a first aspect of the present invention, there is provided an identification information centralizing method comprising the steps of: assigning centralized identification information for identifying a customer by a centralizing corporation; and registering individual identification information which is uniquely assigned in such a manner as to be associated with the centralized identification information so that a plurality of corporations which provide services to a pre-registered customer identify the customer, making it possible to provide services by a plurality of individual corporations by using a single item of centralized identification information.

Since the individual identification information assigned by a plurality of individual corporations is registered in a database in such a manner as to be associated with the a single item of centralized identification information, it is only necessary that the customer manages only the a single item of centralized identification information without managing the individual identification information assigned by each individual corporation. Thus, the management is easy. When the customer having the centralized identification information is newly registered in the individual corporation and is assigned with the individual identification information, this case can be dealt with by only adding the individual identification information in the database, and thus the flexibility is high.

In the above-described identification information centralizing method according to the present invention, the centralizing corporation handles authentication as to whether or not the provision of services by the individual corporation should be permitted on the basis of the centralized identification information of the customer who desires the provision of services. As a result, it is not necessary to receive authentication for each individual corporation, and operations on the customer side and operations performed by each individual corporation can be reduced.

In this case, the centralizing corporation may issue, to a customer to whom the centralized identification information is assigned, a single card in which the centralized identification information is recorded, and may perform the authentication on the basis of the centralized identification information recorded on the card. Since each of a plurality of individual corporations does not require to provide a card, it is easy for the customer to manage cards, and each individual corporation can reduce the operations and expensed involved in the issuance of the card. It is not always necessary to record the centralized identification information on the card, and alternate information which can be uniquely converted into the centralized identification information may be recorded on the card. As a result of such alternate information being recorded, the leakage of the centralized identification information is reduced, and the security can be improved.

In the foregoing, service identification information for identifying services provided by the individual corporation may be registered in such a manner as to be associated with the centralized identification information of the database, and the centralizing corporation may obtain the corresponding service information from the individual corporation on the basis of the service identification information registered in the database and may distribute the service information to the customer. Since the service information provided by each individual corporation is distributed to the customer by a single item of centralizing corporation on the basis of the service identification information registered in the database, the customer is able to obtain desired service information via the centralizing corporation without directly accessing each individual corporation, and this is very convenient.

In this case, the customer information for the customer for whom the centralized identification information is registered may be recorded in such a manner as to be associated with the centralized identification information, and the service information obtained from the individual corporation may be selected on the basis of the customer information and may be distributed to the customer. Examples of the customer information include the area information regarding the place where the customer lives, and history information regarding the services which were received in the past by the customer from the individual corporation. When the amount of information to be distributed to the customer becomes large, there is a risk in that necessary information is buried in the other information. However, by selecting information on the basis of such customer information, only information which is highly necessary for the customer is distributed, and the customer satisfaction can be improved. For example, when a customer who lives in the Kanto area wants to purchase a concert ticket, since it is considered that the customer hardly needs concert information of an area other than the Kanto area, concert information of only the Kanto area is distributed.

[Portal Information Providing Apparatus]

According to a second aspect of the present invention, there is provided a portal information providing apparatus that can communicate with individual servers which are managed correspondingly by a plurality of individual corporations which provide services to a pre-registered customer and a terminal of the customer via a network and that is managed by a centralizing corporation for centralizing the individual corporations, the portal information providing apparatus comprising: assigning means for assigning to the customer centralized identification information for identifying the customer; and a database in which the individual identification information which is uniquely assigned correspondingly by the individual corporations in order to identify the customer is registered in such a manner as to be associated with the centralized identification information.

In this case, the portal information providing apparatus may further comprise authentication means for performing authentication as to whether or not the provision of services by the individual corporation should be permitted on the basis of the centralized identification information of the customer. The authentication means may perform the authentication on the basis of the centralized identification information recorded on a card on which the centralized identification information or alternate information which can be uniquely converted into the centralized identification information is electronically recorded, the card being issued to the customer to whom the centralized identification information is assigned by the centralizing corporation, or on the basis of centralized identification information obtained by converting the alternate information recorded on the card.

The centralized identification information or the alternate information recorded on the card, read by a card reader connected to the terminal of the customer, may be received via the terminal of the customer.

The portal information providing apparatus in accordance with the second aspect of the present invention may further comprise: service registration means for registering service identification information for identifying services provided by the individual corporation in such a manner as to be associated with the centralized identification information of the database; and distribution means for obtaining the corresponding service information from the individual server on the basis of the service identification information registered in the database and for distributing portal information containing the service information to the terminal of the customer.

In this case, the database has recorded therein customer information regarding the customer for whom the centralized identification information is registered in such a manner as to be associated with the centralized identification information, and the distribution means may select the service information obtained from the individual server on the basis of the customer information and may distribute the service information to the customer. Examples of the customer information include the area information on the place where the customer lives and the history information regarding the services which were received in the past by the customer from the individual corporation.

According to the portal information providing apparatus in accordance with the second aspect of the present invention, the same operational advantages as those of the identification information centralizing method in accordance with the first aspect of the present invention can be obtained.

[Program and Information Recording Medium for Portal Information Providing Apparatus]

According to a third aspect of the present invention, there is provided a program for allowing a computer to function as a portal information providing apparatus in accordance with the second aspect of the present invention.

According to a fourth aspect of the present invention, there is a computer-readable information recording medium having recorded thereon a program in accordance with the third aspect of the present invention.

[IC Card]

According to a fifth aspect of the present invention, there is provided an IC card in which a single item of centralized identification information which is associated with a plurality of items of individual identification information which are uniquely assigned to identify a customer by a plurality of individual corporations or alternate information which can be uniquely converted into the centralized identification information is electronically recorded.

Since a single item of centralized identification information or alternate information is recorded on this IC card and the centralized identification information is associated with the individual identification information assigned by a plurality of individual corporations, services provided by a plurality of individual corporations can be received by using a single card, and the management of cards is easy. When the customer to whom this IC card is issued is newly registered in the individual corporation, this case can be dealt with by only adding the individual identification information thereof in such a manner as to be associated with the centralized identification information, and there is no need to issue a new card.

BRIEF DESCRIPTION OF THE DRAWINGS

FIG. 4 shows customer personal information according to the embodiment of the present invention.

FIG. 6 shows related provided information according to the embodiment of the present invention.

FIG. 7 shows an example of a narrowing database according to the embodiment of the present invention.

FIGS. 8A to 8C show examples of a screen image of information displayed on a customer terminal according to the embodiment of the present invention; FIG. 8A shows a top page; FIG. 8B shows a joining page; and FIG. 8C shows an individual ID registration page.

FIG. 9A shows a pop-up display during an authentication process; FIG. 9B shows a category registration page; and FIG. 9C shows a service item registration page.

FIG. 13 is a flowchart showing an individual ID registration processes according to the embodiment of the present invention.

FIG. 14 is a flowchart showing a service ID registration according to the embodiment of the present invention.

BEST MODE FOR CARRYING OUT THE INVENTION

The embodiments of the present invention will now be described below with reference to the drawings.

In the following description, it is assumed that a corporation group is formed by a plurality of corporations that provide various services to customers and that a corporation that centralizes or represents in some form corporations within the corporation group exists, and separate corporations are referred to as "individual corporation" and the corporation that centralizes these corporations is referred to as a "centralizing corporation".

The services provided by individual corporations are not limited particularly, and include not only provision of services, but also sales of goods, and all other services. Being charged for services or not does not matter. Examples include sales of tickets for performances such as public performances, dramas, movies, the watching of sports, etc.; sales of music CDs (Compact Disc) and music data itself; services of connection to the Internet, etc.; sales of computer software and hardware and other goods; and financial services including credit services and electronic-money services, etc. Furthermore, information provision associated with the provision of these services, services whose main purpose is information provision are also included.

In the following description, a description is given by assuming that each individual corporation and the centralizing corporation provides services by using a network such as the Internet. However, the present invention is not necessarily limited to that in which a network such as the Internet is used, and can also be applied to transactions conducted in an actual shop or conducted by using means such as postal services.

[Overall System]

Figure 1:
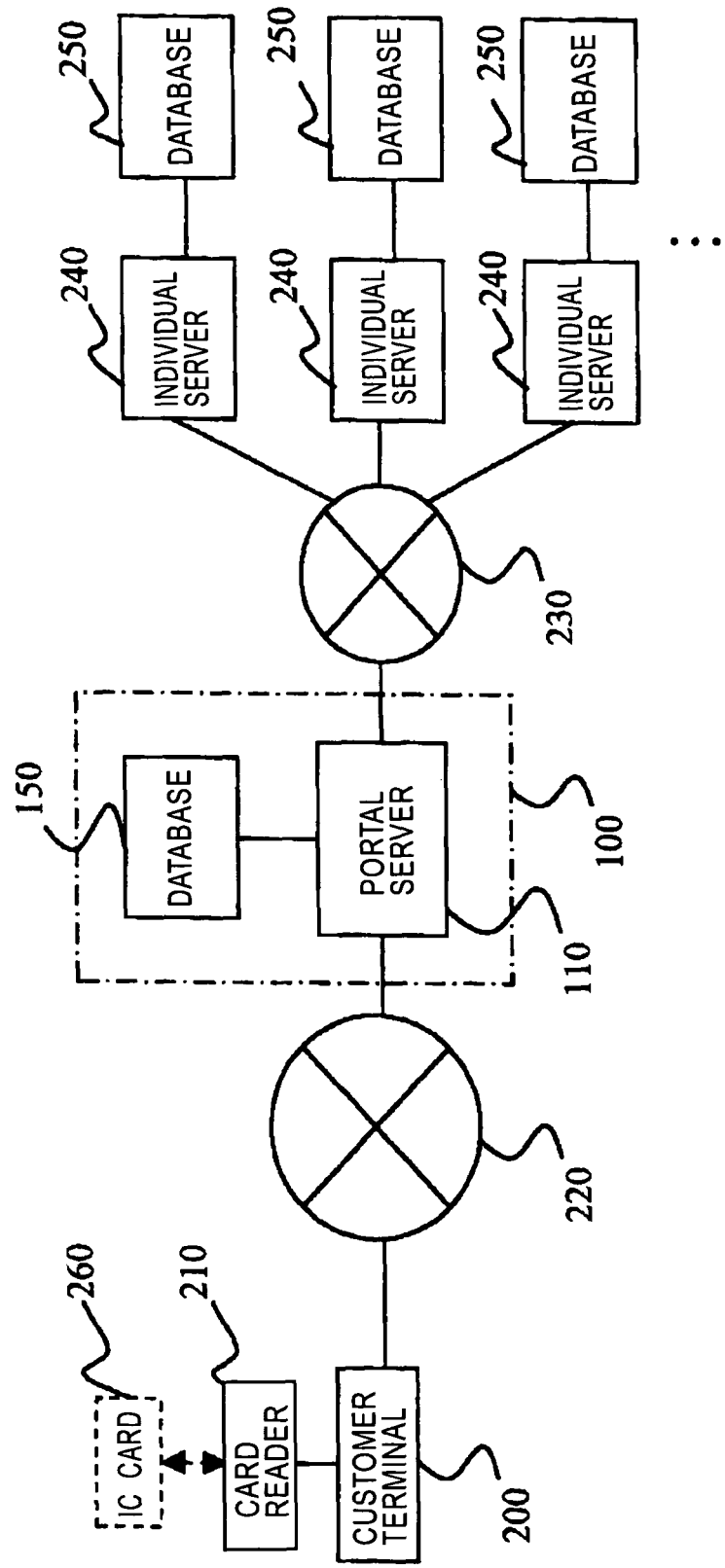
FIG. 1 is a block diagram showing the entire configuration of a system according to an embodiment of the present invention.

FIG. 1 is a block diagram showing the overall configuration of a portal information providing system according to an embodiment of the present invention.

In FIG. 1, reference numeral 100 denotes a portal site managed by the centralizing corporation, and the portal site 100 is formed of a portal server 110 and a database 150. The database 150 is a storage device included in the portal server 110 or a database server capable of communication via a network such as a LAN (Local Area Network).

Reference numeral 200 denotes a terminal device (customer terminal) used by a customer who is a user of this system. This customer terminal 200 is connected to a network 220 such as the Internet. The customer terminal 200 may be either a terminal device provided indoors or a portable terminal device. A card reader 210 for electronically reading information recorded on an IC card 260 (to be described later) is connected to the customer terminal 200.

The customer terminal 200 and the portal server 110 can communicate with each other via the network 220. The network 220, regardless of being wired or wireless, operates so as to be able to transmit and receive information to and from a device connected thereto when that device establishes a session with that target device. In FIG. 1, although the network 220 is displayed in a simplified manner, the configuration thereof is more complex in practice. For example, in the case of the Internet, the Internet is formed in such a manner that a plurality of networks are combined via gateways. For the connection thereof, the connection is not limited to a case of being directly connected to what is commonly called a backbone, and the connection may be such that, even if a connection is made temporarily by PPP connection, etc., it is only necessary that, when a session is established, transmission and reception of information can be performed therewith.

The portal server 110 can communicate with individual servers 240 which are managed by a plurality of individual corporations via a network 230. The network 230 may be a network used in a dedicated manner within a corporation group formed of the centralizing corporation and individual corporations or may be the same as the network 220 such as the Internet. Although not shown in the figure, also, the customer terminal 200 can communicate with each individual server 240 via the network 220 in a direct manner (without going through the portal server 110). The individual servers 240 each have a database 250. In each database 250, various types of information used when services are provided by the corresponding individual server 240 are stored.

The portal server 110 and each individual server 240 also serve as a WWW (World Wide Web) server for providing a home page, a mail server, and a CGI (Common Gateway Interface) server.

The portal server 110 and each individual server 240 need not to be realized by a single computer, and may be realized by a plurality of computers.

The portal server 110 is formed of, for example, a general-purpose computer. This general-purpose computer comprises a CPU (Central Processing Unit) or an MPU (Micro Processor Unit); storage devices such as RAM (Random Access Memory), ROM (Read Only Memory), and a hard disk; input devices such as a keyboard, a mouse, etc.; a display device such as a CRT (Cathode Ray Tube) or a liquid-crystal display device; and communication interfaces such as a modem, a terminal adaptor, a router, etc. The general-purpose computer further comprises external storage devices, such as a CD-ROM device, a DVD (trademark) device, a hard disk device, a magneto-optical device, a flexible disk device, a magnetic tape, etc. These external storage devices are devices for reading a program recorded on a portable information recording medium into a server. Furthermore, the portal server 110 has stored therein at least an OS (Operating System) and an HTTP server program in order to enable communication via the networks 220 and 230. Each individual server 240 also has substantially the same configuration as that of the portal server 110.

The customer terminal 200 comprises a CPU or an MPU; storage devices such as RAM, ROM, a hard disk, etc.; input devices such as a keyboard, a mouse, etc.; a display device such as a CRT or a liquid-crystal display device; and communication interfaces such as a modem, a terminal adaptor, a router, etc. Furthermore, it is preferable that the customer terminal 200 have external storage devices similar to those described above. Furthermore, the storage device within the customer terminal 200 has stored therein at least an OS (Operating System) and an HTTP (HyperText Transfer Protocol) browsing program (browser, etc.) in order to enable communication via the network 220.

The card reader 210 included in the customer terminal 200 is a device for reading and writing various types of information which is electronically recorded on an IC card (electronic-money card) 260 issued by the centralizing corporation. The card reader and the IC card 260 in this embodiment are of a non-contact type (wireless communication method), and simply by bringing (holding up) the IC card 260 closer to the data reading section of the card reader 210, data communication can be performed between the IC card 260 and the card reader 210. However, of course, the card reader and the IC card 260 may be of a contact type rather than such a non-contact type.

[IC Card]

Figures 18, 19:
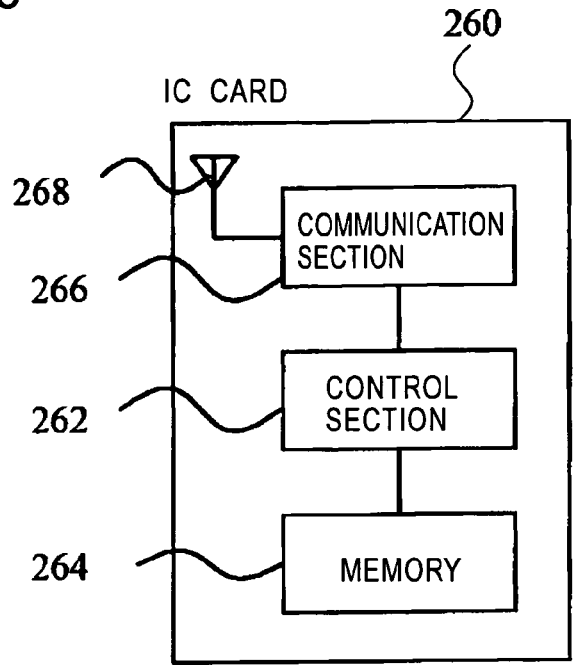
FIG. 18 shows the configuration of an IC card according to the embodiment of the present invention.
FIG. 19 shows the structure of card information recorded on an IC card according to the embodiment of the present invention.

The IC card 260 of this embodiment is also an electronic-money card functioning as an electronic purse for using electronic money, and is formed in such a manner that an IC chip, a power supply, etc., are housed inside a plastic card of approximately the size of a business card. On the surface of the IC card 260, the name of the IC card, the credit card number, etc., are printed so as to be capable of being visually recognized. As shown in FIG. 18, the IC card 260 comprises a control section 262, a memory 264, a communication section 266, and an antenna 268.

The control section 262 performs control of the reading and writing of data to and from the memory 264, control of the communication section 266 for performing data communication with the card reader 210, and other control.

In the memory 264, card information shown in FIG. 19 is stored. The card information is composed of a centralized ID (14-digit number in this embodiment) assigned by the centralizing corporation, a unique ID (alternate information), the card issuance date (containing the expiration data), the balance of the electronic money, the history of receipt of money, the history of payment, and other information.

The "unique ID" is information which can be uniquely converted into other identification information for identifying the centralized ID or the customer. That is, when transmission and reception of information containing the centralized ID is performed via the Internet, etc., there is a risk in that the information leaks externally and the centralized ID may be illegally used. For this reason, information containing this unique ID is transmitted from the customer terminal 200, and in the server 110 receiving this information, the information is converted into another ID for identifying the centralized ID or the customer on the basis of the unique ID. Thus, the unique ID is identification information used to protect important information such as the centralized ID.

When the IC card 260 is brought closer (held up) to the card reader 210, since an information reading instruction or an information writing instruction is generated from the card reader 210, this is received via the communication section 266. In the case of the information reading instruction, card information is read from the memory 264, and this is transmitted to the card reader 210. In the case of the information writing instruction, writing information (the balance, the history of receipt of money, the history of payment, etc.) sent from the card reader 210 is written into the memory 264.

[Portal Site]

Figure 2:
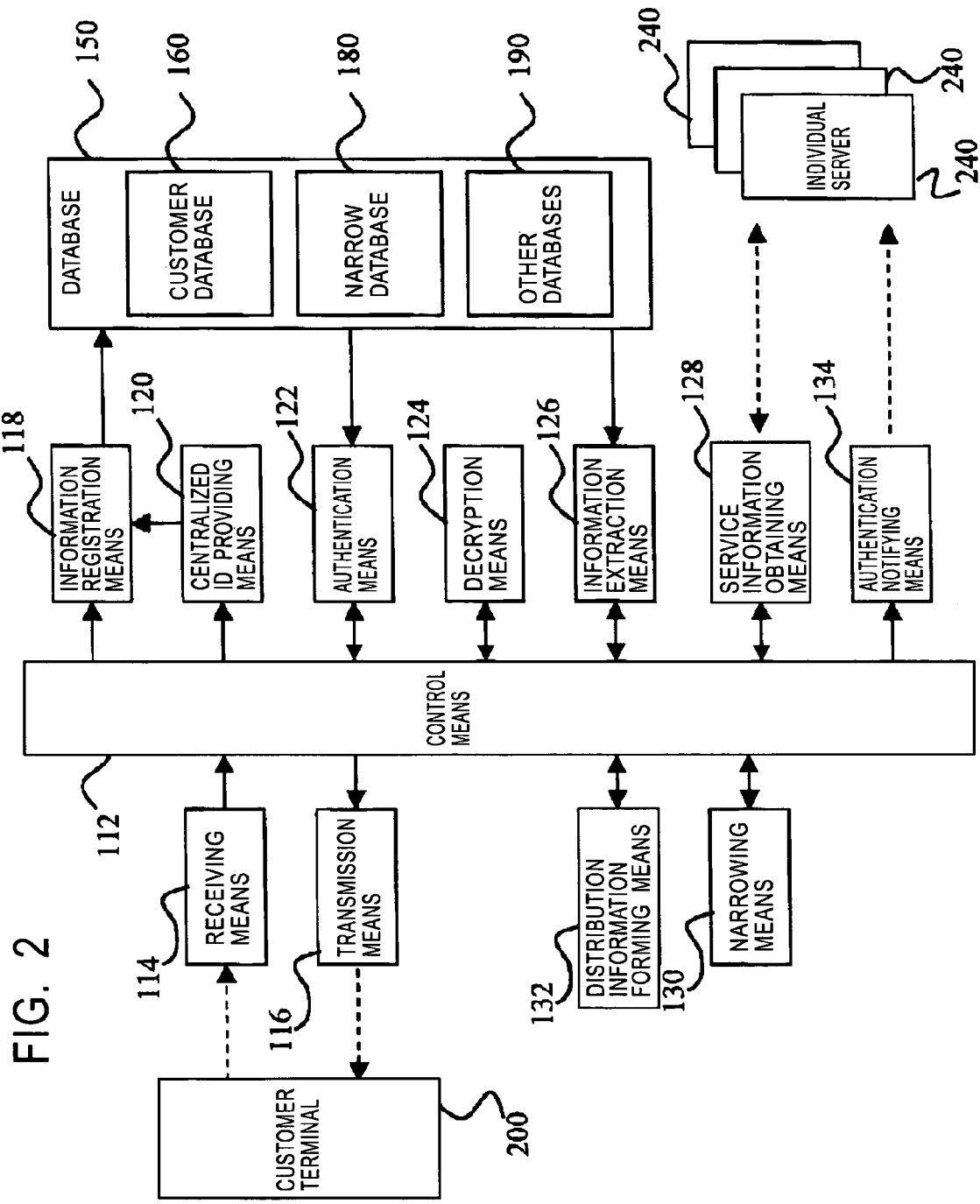
FIG. 2 is a block diagram showing the configuration of a portal server according to the embodiment of the present invention.

FIG. 2 is a block diagram showing the detailed configuration of a portal site 100 (portal server 110) managed by the centralizing corporation.

This portal server 110, as shown in FIG. 2, comprises control means 112, receiving means 114, transmission means 116, information registration means 118, centralized ID assigning means 120, authentication means 122, decryption means 124, information extraction means 126, service information obtaining means 128, narrowing means 130, distribution information forming means 132, and authentication notifying means 134.

The control means 112 performs control of the means 114 to 134, control of communication with the customer terminal 200, each individual server 240, and the database 150, and other control. The receiving means 114 receives an information providing request from the customer terminal 200 and other requests, and the transmission means 116 transmits various types of information containing page information (files written by hypertext, image files, etc.) to the customer terminal 200.

The information registration means 118 performs various registrations and recordings for the customer database 160 of the database 150. That is, the centralized ID assigned to a customer by the centralized ID assigning means 120 at the time of customer registration is registered in the customer database 160, and various types of information input by the customer are registered as the customer personal information 164 (to be described later) in the customer database 160 in such a manner as to be associated with the centralized ID. Furthermore, the information registration means 118 registers the individual ID assigned to the customer by the individual corporation at the time of individual ID registration as the individual ID information 168 (to be described later) in the customer database 160 in such a manner as to be associated with the centralized ID. Furthermore, at the time of service ID registration, the service ID which is identification information for identifying various services by the individual corporation, which are desired by the customer to be provided via the portal server 110, is registered as related provided information 170 (to be described later) in the customer database 160 in such a manner as to be associated with the centralized ID.

The authentication means 122 determines whether or not the customer who has made the access can receive portal services by this server 110, that is, whether or not the customer is a properly registered person, is determined on the basis of the centralized ID and other information (for example, when a password is set, that password). If the customer who has made the access is not a properly registered person, a message that the provision of services be rejected is transmitted to the customer terminal 200 via the control means 112.

The decryption means 124 decrypts various types of information, which is encrypted from the viewpoint of security, sent from the customer terminal 200. In this embodiment, the information which is read by the customer holding up the IC card 260 to the card reader 210 is encrypted by a predetermined encryption technique and is sent, and the decryption means 124 decrypts this information.

The information extraction means 126 extracts necessary information from the database 150. More specifically, the information extraction means 126 searches the customer database 160 on the basis of the centralized ID of the customer who has made the access in order to extract the customer personal information 164, the customer history information 166, the individual ID information 168, the related provided information 170, etc., which are registered in such a manner as to be associated with the centralized ID.

The service information obtaining means 128 sends, to each individual server 240 within this corporation group, the service ID related to the services for which information should be obtained, and receives service information corresponding to this service ID from the individual server 240. In this embodiment, the service information to be obtained by the service information obtaining means 128 is obtained individually with regard to necessary service information when the distribution of that service information becomes necessary for the customer. However, the service information related to all the service IDs may be obtained in advance collectively in a periodical manner.

The narrowing means 130 performs a process for selecting information (service information) to be distributed to the customer on the basis of the information set in the narrowing database 180 so that the information is narrowed to information which is estimated to be more useful for the customer. When the amount of information to be distributed to the customer is enormous, it is necessary for the customer to search for information useful for the customer from among the enormous amount of information, and time and effort are wasted. In this embodiment, such a problem is avoided in such a manner that information is filtered by the narrowing means 130 and is distributed to the customer.

The distribution information forming means 132 generates a Web page (composed of files written by hypertext, image files, etc.) in which information to be distributed to the customer terminal 200 is set. The Web page generated here is sent to the customer terminal 200 via the control means 112 and the transmission means 116, and a screen shown in FIGS. 8A to 8C, FIGS. 9A to 9C, and FIG. 10 is displayed in the browser window of the display device provided in the customer terminal 200.

The authentication notifying means 134 notifies the individual server 240 that the customer authenticated by the authentication means 122 has already been authenticated so that the customer authentication process by the individual server 240 can be omitted. In a case where the customer authenticated to be an authorized customer by this portal server 110 accesses the individual server 240 by going through a link set in a my portal page (to be described later), an operation or a process for receiving authentication again by the individual server 240 is troublesome. Therefore, if the authentication is once received by this server 110, provision of services by the individual server 240 can be received without performing an authentication process again.

[Database]

As shown in FIG. 2, the database 150 comprises the customer database 160, the narrowing database 180, and other database 190.

In the customer database 160, various types of data on the customer is registered or recorded for each of the customers registered in this portal site. The narrowing database 190 is a database in which information which serves as a basis for selecting information to be distributed to the customer by the narrowing means 130 is set in advance. The other database 190 is a database in which all information required to provide this portal service is set. In the other database 190, for example, service information in a case where the service information is collectively obtained in advance from the individual server 240 by the service information obtaining means 128 is recorded.

Figure 3:
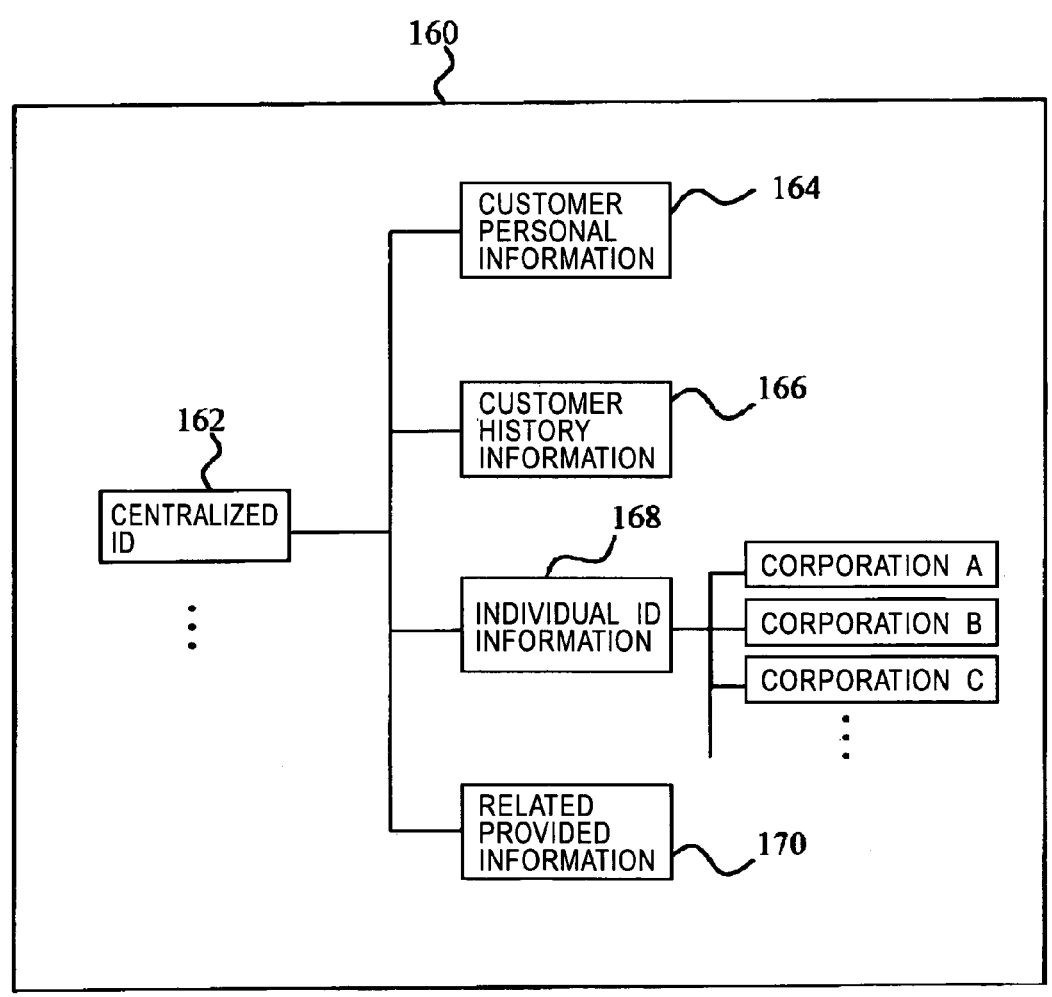
FIG. 3 shows the structure of a customer database according to the embodiment of the present invention.
Figure 5:
FIG. 5 shows customer history information according to the embodiment of the present invention.

The details of the customer database 160 will now be described with reference to FIGS. 3 to 6. As shown in FIG. 3, in the customer database 160, a centralized ID 162 is registered for each customer, and the customer personal information 164, the customer history information 166, the individual ID information 168, and the related provided information 170 are registered in such a manner as to be associated with the centralized ID 162. The centralized ID 162 is identification information assigned to identify a customer who is a member of this portal service from the other customers, and is composed of, for example, 16-digit alphanumeric characters.

As seen from the details of the customer personal information 164 shown in FIG. 4, the customer personal information 164 is formed of the name of the customer, the address, the postal-code number, the mail address, the phone number, and other information related to the customer individual. For this customer personal information 164, each item of information is recorded when the customer is properly registered in this portal server 110. When a change occurs in each item, the item is changed as appropriate each time.

The customer history information 166 is information which indicates the history such that the customer has conducted business transactions with individual corporations. As seen from the details of the customer history information 166 shown in FIG. 5, the customer history information 166 is additionally recorded or stored in sequence when the business transaction is concluded with the goods purchased, the purchase date, the price, the place of purchase, and other information related to the history being the forming units. When the customer history information 166 exceeds a predetermined number of items or a predetermined period has passed, it is preferable that the customer history information 166 be deleted starting with the older items in sequence. The customer history information 166 is not limited to such a purchase history of goods, etc., and appropriate information is recorded or stored according to the type of services provided by the individual corporation.

The individual ID information 168 is information composed of a single or a plurality of individual IDs assigned to the customer by the individual corporation. When the customer having the centralized ID performs a predetermined operation, the information is registered by the information registration means 118 in such a manner as to be associated with the centralized ID.

As seen from the details of the related provided information 170 shown in FIG. 6, the related provided information 170 is information for identifying various services from one another, provided by the individual corporation for which the customer has registered an individual ID. When the customer performs a service ID registration, the information is registered by the information registration means 118 in such a manner as to be associated with the centralized ID.

A narrowing database 180 set in the database 150 is a database in which information which is a basis for selecting and narrowing information to be distributed to the customer (service information) is set. In this embodiment, as an example, an area code database shown in FIG. 7 is set. This area code database 180 is formed in such a manner that the country of Japan is divided into areas, the administrative divisions of Japan, cities, towns, and villages, and an area code is set for each area. For example, as shown in FIG. 7, for the area of "around Tokyo", an area code is "01"; for the area of "Osaka area", an area code is "02"; and for the whole country, an area code is "99". In this embodiment, three databases are provided so that an area code can be obtained from each of the "address", "postal-code number", or the "phone number" of the customer. However, the narrowing database is not limited to such an area code database, and may be information required to specify information, among the service information, which is estimated to be useful for the customer. For example, the database may be formed in such a manner that the hobbies of the customer, the occupation thereof, the family structure, the income thereof, etc., are recorded, as other information, in the customer personal information 164, and an identification code is assigned to each of these items.

[Processes Performed by This System]

Various processes in this embodiment will now be described below in accordance with a flowchart.

[Main Processing]

Figure 11:
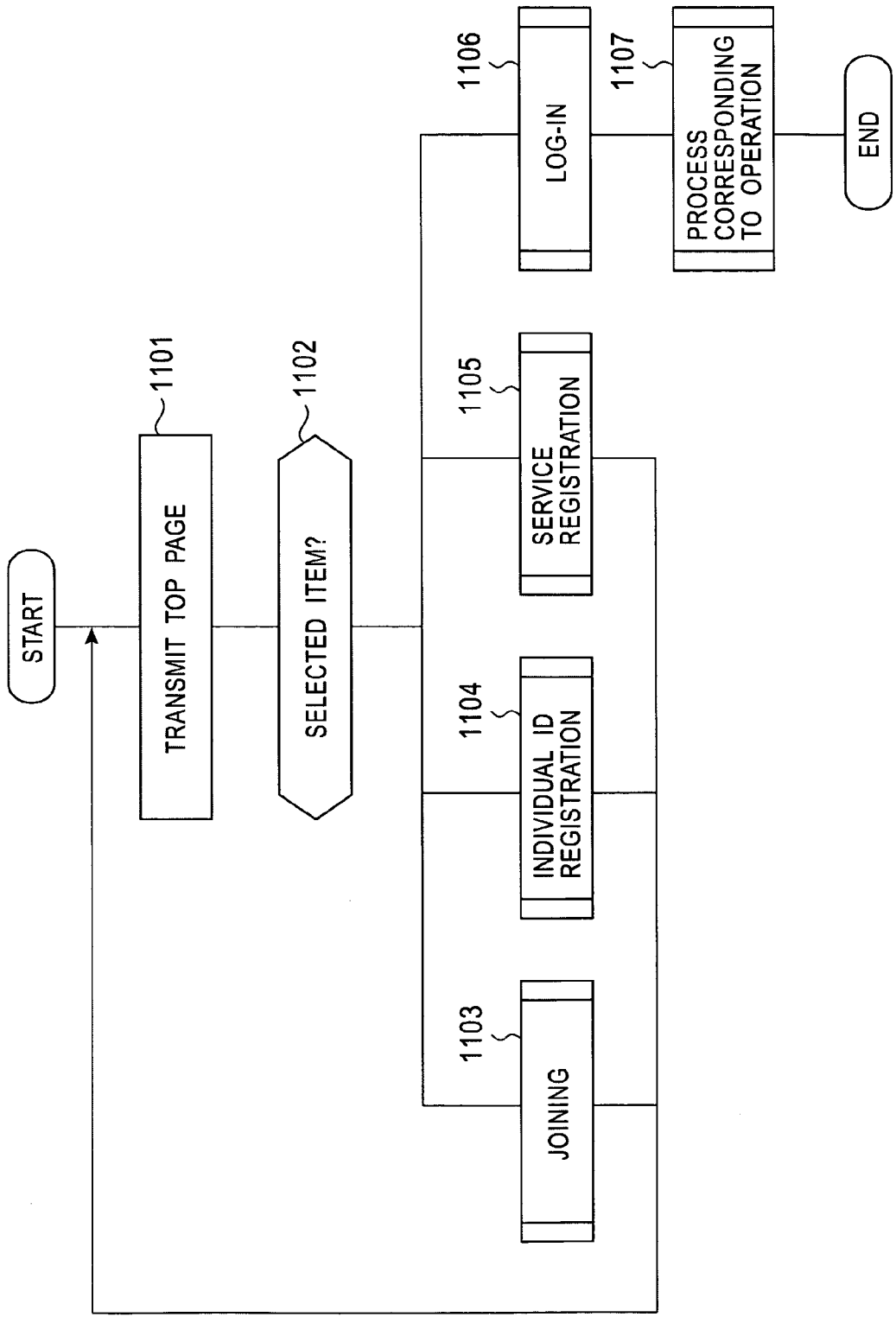
FIG. 11 is a flowchart showing a main process according to the embodiment of the present invention.

FIG. 11 is a flowchart showing a main process of the portal server 110.

In the customer terminal 200, the customer starts up the browser, inputs the URL (Uniform Resource Locator) at the top page of this portal site in order to perform an operation for accessing it, a request of downloading the top page is transmitted from the customer terminal 200. This request is sent to control means 112 via receiving means 114, and the control means 112 transmits the files (files written by hypertext, image files, etc.) forming the top page by distribution information forming means 132 to the customer terminal 200 via transmission means 116 (step 1101).

As a result, in the browser window of the display device of the customer terminal 200, a display whose screen image is displayed in FIG. 8A is provided. On the top page, the following displays are performed: "join" for making a registration in order to newly receive provision of this portal service; "individual ID registration" for registering an individual ID which is already assigned to receive provision of services by an individual corporation; "service registration" for registering a service ID which is the type of services which are desired to be received by a customer via this portal site among the services provided by each individual corporation to which the customer is subscribed; and "log-in" for logging in to this portal site.

At this top page, not only the display shown in FIG. 8A, but also links to other sites including the individual servers 240, banner commercial, and other information may be displayed. The same applies to the other pages (to be described later). A link to the CGI program inside this server is established for each item displayed at this top page. When the customer clicks a desired item among the displayed items by using a mouse attached to the customer terminal 200, this fact is notified to the control means 112.

The control means 112 determines the type of the selected item (step 1102). When the selected item is "join", a joining process is performed (step 1103). When the selected item is "individual ID registration", an individual ID registration process is performed (step 1104). When the selected item is "service registration", a service ID registration process is performed (step 1105). When the selected item is "log-in", a log-in process is performed (step 1106).

When the execution of the joining process (step 1103), the individual ID registration process (step 1104), and the service ID registration process (step 1105) is terminated, the process returns to step S1101.

[Joining Process]

Figure 12:
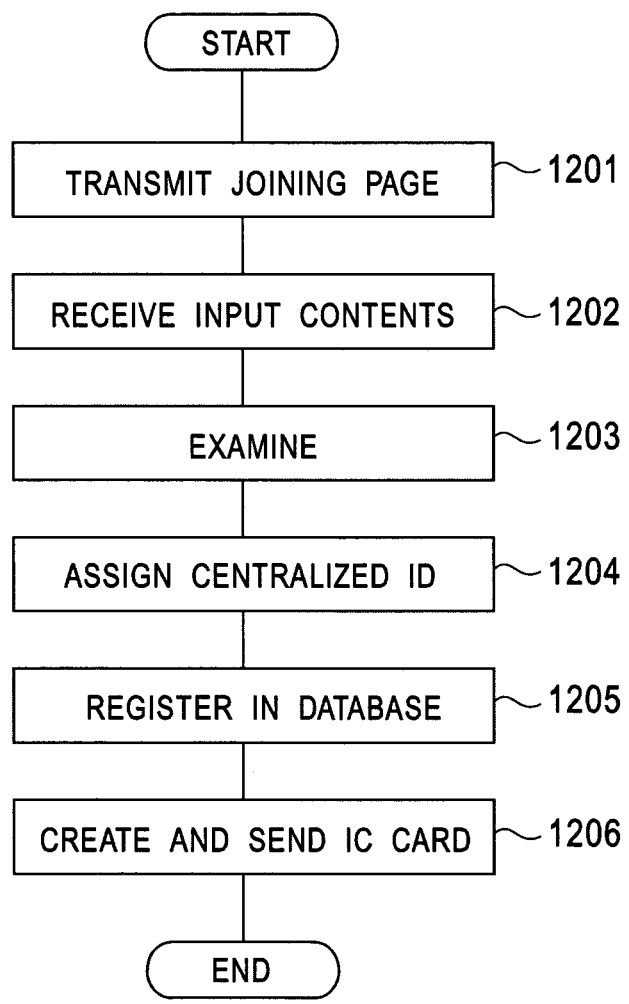
FIG. 12 is a flowchart showing a joining process according to the embodiment of the present invention.

FIG. 12 is a flowchart showing a joining process to be performed by this server.

At the top page, when "join" is selected by the customer, the joining process is started, and the control means 112 transmits the files (files written by hypertext, image files, etc.) forming the joining page to the customer terminal 200 via the transmission means 116 (step 1201).

In the browser window of the display device of the customer terminal 200, as its screen image is shown in FIG. 8B, a joining page having input columns for inputting "name", "address", "phone number", "mail address", and other information related to the customer is displayed.

When the customer inputs the information of the customer himself/herself to the corresponding input column of each item and clicks the transmit button, the input information is received by the receiving means 114, and the information is passed to the control means 112 (step 1202). The control means 112 performs an examination process as necessary (step 1203). For the examination process, for example, whether or not the customer satisfies predetermined joining conditions on the basis of the input information and credit information possessed by each individual corporation. It is assumed here that there is no problem in the examination.

When there is no problem in the examination, the control means 112 instructs the centralized ID assigning means 120 to assign a centralized ID. The centralized ID assigning means 120 refers to the customer database 160 in order to generate a new centralized ID which does not duplicate the centralized ID which has already been registered and passes the centralized ID to information registration means 118. The information registration means 118 newly registers the centralized ID in the customer database 160, and records the information input by the customer as the customer personal information 164 in such a manner as to be associated with this centralized ID (step 1205).

In this embodiment, it is assumed that, when the centralized ID is newly assigned, the IC card 260 which can be used as electronic money is issued to the customer, and as a result of the new registration, a notification for instructing the creation and the sending of the IC card 260 is sent to the section in charge (step 1206). The section in charge records necessary information containing the centralized ID in the IC card 260 and distributes the information to the address of the customer.

[Individual ID Registration Process]

FIG. 13 is a flowchart showing an individual ID registration process to be performed by this server.

At the top page, when "individual ID registration" is selected by the customer, an individual ID registration process is started, and the control means 112 transmits the files (files written by hypertext, image files, etc.) forming the individual ID registration page to the customer terminal 200 via the transmission means 116 (step 1301).

In the browser window of the display device of the customer terminal 200, as its screen image is shown in FIG. 8C, an individual ID registration page having an input column for inputting "individual ID" is displayed.

When the user inputs the individual ID which has already been assigned by the individual server 240 to the input column of the individual ID and clicks the transmit button, the input information is received by the receiving means 114, and the information is passed to the control means 112 (step 1302).

Figure 9C:
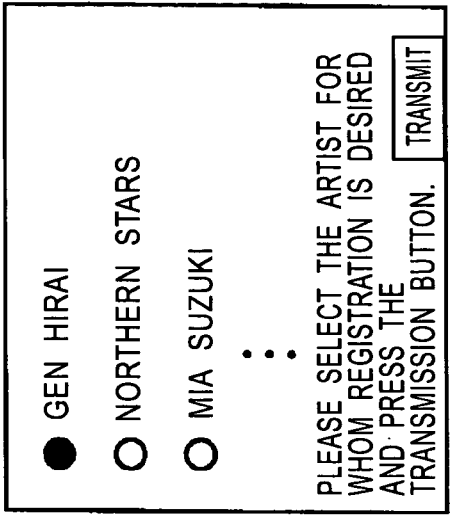
FIGS. 9A to 9C show examples of a screen image of information displayed on a customer terminal according to the embodiment of the present invention.
Figure 9B:
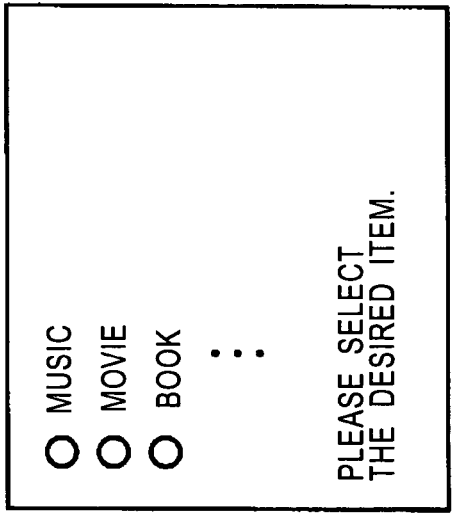
Figure 9A:
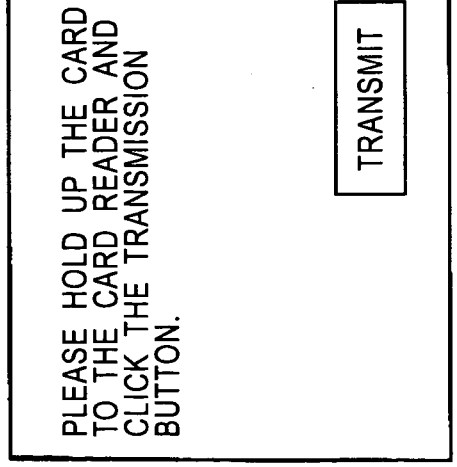

Next, in order to obtain information for authenticating the customer, the control means 112 transmits the files (files written by hypertext, image files, etc.) forming the pop-up display shown in FIG. 9A to the customer terminal 200 via the transmission means 116 (step 1303).

When the customer holds up the IC card 260 to the card reader included in the customer terminal 200 in accordance with the screen display, information containing the centralized ID which is electronically recorded on the IC card 260 is read, and the information containing the centralized ID is transmitted, and so the control means 112 receives this information (step 1304).

Next, an authentication process by the authentication means 122 is performed (step 1305). That is, a check is made to determine whether or not the customer is a properly registered person so as to receive this portal service on the basis of the customer database 160.

Thereafter, whether or not the customer is a person who is properly registered in the individual server 240, whether or not the customer has a correct individual ID input in step 1302, or the like are checked by making inquiries to the individual server 240 (step 1306) as required.

Next, the results of the authentication process (1305) and the inquiry to the individual server (1306) are determined (step 1307). When it is determined that there is no problem (in the case of OK), the individual ID received in step 1302 is registered as the individual ID information in the customer database 160 in such a manner as to be associated with the centralized ID (1308). When it is determined in step 1307 that there is a problem (in the case of NG), a predetermined error message is transmitted to the customer terminal 200 (step 1309), and the process returns to step S1301.

[Service ID Registration Process]

FIG. 14 is a flowchart showing a service ID registration process to be performed by this server.

At the top page, when "service registration" is selected by the customer, a service ID registration process is started, and the control means 112 transmits the files (files written by hypertext, image files, etc.) forming the category registration page to the customer terminal 200 via the transmission means 116 (step 1401).

As a result, in the browser window of the display device of the customer terminal 200, a display whose screen image is shown in FIG. 9B is performed. The category registration page is a page for registering what kind of genre of information is desired to be displayed on the my portal page by the customer (the details will be described later). In this embodiment, as shown in FIG. 9B, "music" which is a category related to music, "movie" which is a category related to movie, "book" which is a category related to books, etc., are displayed.

Categories to be displayed here may include "news", "finance", "corporation information", "real estate", "gourmet", "auction", "game", or any other types. This category does not need to individually correspond to the services provided by each individual corporation, and the category can be selected so as to comprehensively include the services provided by plural corporations among the corporations. For example, when there is an individual corporation which sells tickets of concerts, etc., and an individual corporation which sells music CDs, "my music" which is a category related to music covers both of these. However, this category may correspond to one of individual corporations, for example, "concert tickets" and "music CDs".

For each item displayed on the this category registration page, a link to the CGI program inside this server is established. When the customer clicks a desired item among the displayed items by using a mouse attached to the customer terminal 200, this fact is transmitted, and the control means 112 receives this via the receiving means 114 (step 1402).

The control means 112 transmits the files (files written by hypertext, image files, etc.) forming the service item registration page corresponding to the category selected by the customer via transmission means 116 (step 1403). Here, by assuming that "music" is selected on the category registration page, a predetermined artist registration page is transmitted as a service registration page corresponding to the "music". On the category registration page, when the customer selects "movie" or "book", a service item registration page which is determined in advance in such a manner as to correspond to that is transmitted.

As a result, in the browser window of the display device of the customer terminal 200, a display whose screen image is shown in FIG. 9C is performed. The artist registration page is a page for registering the information of which artist is desired to be displayed by the customer on the artist registration page (the details will be described later). In this embodiment, as shown in FIG. 9C, "Gen HIRAI", "Northern Stars", "Mia SUZUKI", etc., are displayed. For this page, in the manner described above, not only a display in which artist names are listed, but also input columns for arbitrarily entering an artist name may be displayed in addition to the above or singly so that the customer inputs it. Furthermore, it is also possible that artists are classified beforehand in sequence in a hierarchical manner from a large category to a small category, and the customer arrives at a desired artist by clicking items in sequence.

When the customer clicks to check the radio button displayed at the beginning of the artist name, and then clicks the transmit button, the selected item is transmitted, and the control means 112 receives this item via the receiving means 114 (step 1404).

Next, in order to obtain information for authenticating the customer, the control means 112 transmits the files (files written by hypertext, image files, etc.) for making a pop-up display shown in FIG. 9A on the display device of the customer terminal 200 to the customer terminal 200 via the transmission means 116 (step 1405).

When the customer holds up the card reader included in the customer terminal 200 to the IC card 260 in accordance with the image display, information containing the centralized ID which is electronically recorded on the IC card 260 is read, the information containing the centralized ID is transmitted, and so the control means 112 receives this information (step 1406).

Next, an authentication process by the authentication means 122 is performed (step 1407). That is, a check is made to determine whether or not the customer is a properly registered person in order to receive this portal service on the basis of the customer database 160.

Here, assuming that the customer is a right person, the control means 112 searches for and obtains the information corresponding to the service ID such that the service ID corresponding to the selected item, received in step 1404, is recorded as part of the other database 190 in the database 150 (step 1408).

The service ID obtained here is sometimes just one, but normally, a plurality of IDs are obtained.

For example, in the case of a musical artist, since the information desired by the customer is ticket information, new release information, related articles, etc., the service ID is a service ID for identifying services related to the selected artist, among the services provided by an individual corporation which provides ticket sale services, an individual corporation which provides sale services of music CDs, and an individual corporation which provides related articles.

Figure 15B:
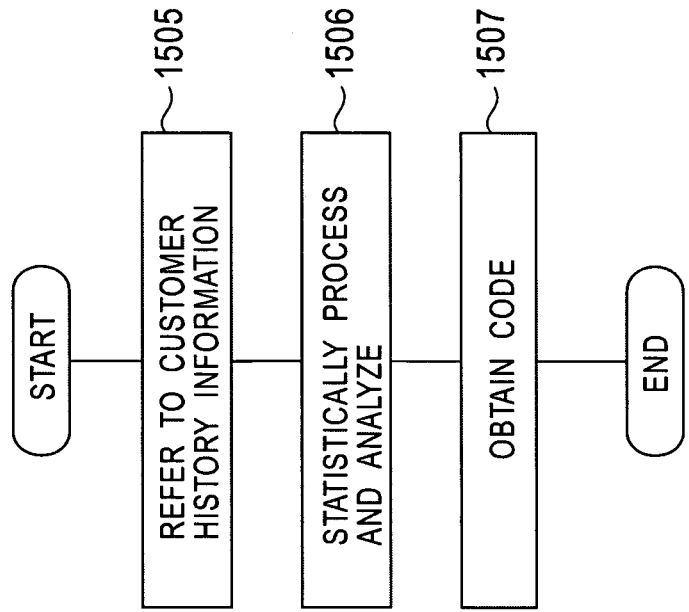
FIG. 15B is a flowchart showing another example thereof.
Figure 15A:
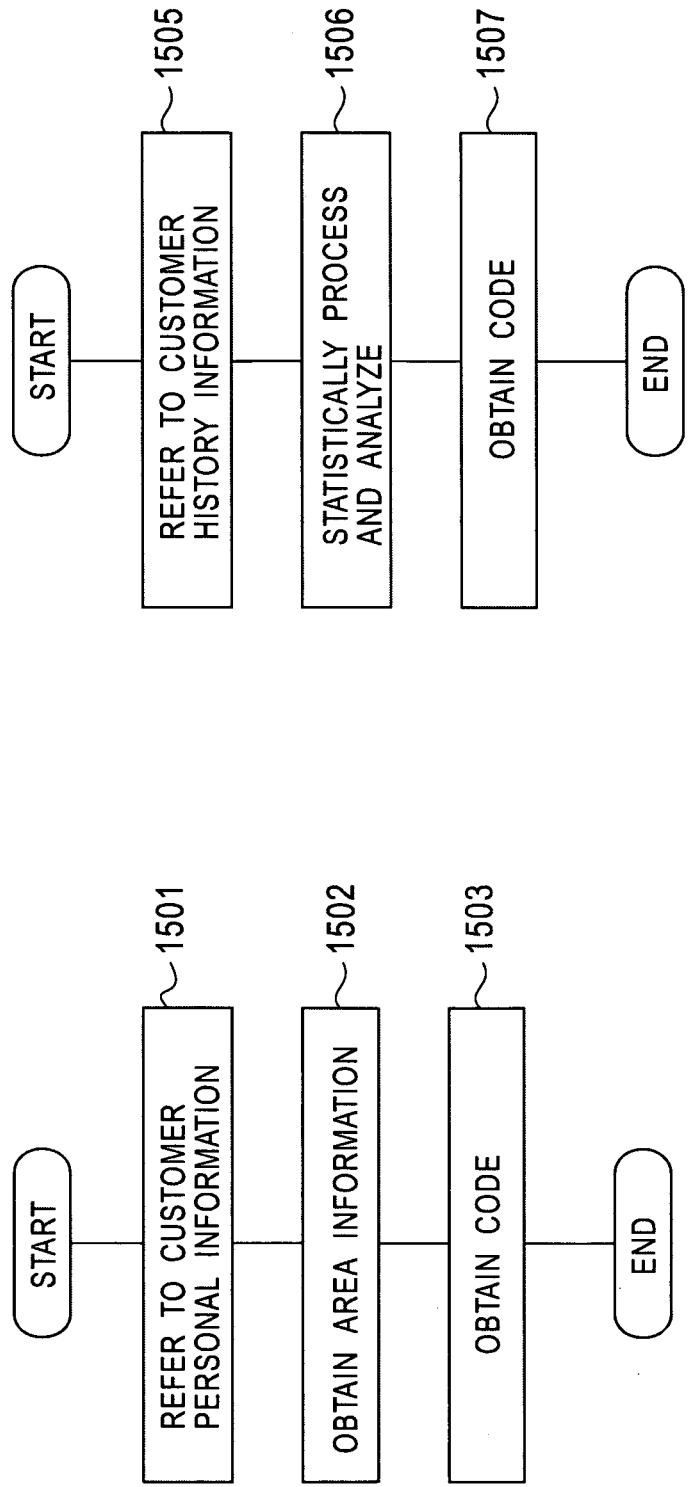
FIG. 15A is a flowchart showing an example of a narrowing registration process according to the embodiment of the present invention.

Thereafter, a narrowing process for selecting information to be distributed as portal information to the customer is performed (step 1409). As shown in FIG. 15A, in the narrowing process, first, reference is made to the customer database 160 (step 1501), and then the name of the administrative division of Japan as the area information among the addresses is extracted from the customer personal information 164 for that customer is extracted (step 1502).

Here, the address of the customer "Taro TOKKO" of this embodiment, shown as an example in FIG. 4, is "Tokyo", and so this is extracted.

Next, reference is made to the narrowing database 180 in order to obtain an area code corresponding to the area which covers "Tokyo" from the area code database related to the addresses (step 1502). In step 1501, a "postal-code number" or a "phone number (out-of-town telephone exchange number)" rather than "address" may be extracted. In these cases, in step 1502, an area code is obtained from the area code database related to postal-code numbers or from the area code database related to telephone numbers.

Referring back to FIG. 14, the service ID obtained in step 1408, and the area code as the narrowing information, are registered as the related provided information 170 in the customer database 160 (step 1410). It is assumed that, for the area information of the related provided information 170, "99" indicating the whole country by default is recorded, and that whether or not narrowing should be performed is set in advance according to the attribute of the service ID. For example, in the example shown in FIG. 6, it is set in advance that, for "ticket based" and "article based", narrowing in accordance with the area is performed, and for "CD based", narrowing in accordance with the area is not performed.

In this embodiment, the area code is obtained on the basis of the address, etc., of the customer personal information, the embodiment is not limited to this. As shown in FIG. 15B, reference may be made to the customer history information (purchase history) shown in FIG. 5 (step 1505), these items of information are statistically processed and analyzed (step 1506), and the area code may be obtained on the basis of this result. For example, for the customer "Taro TOKKO", who lives in Tokyo, when the frequency of buying a concert ticket in Osaka is high, an area code "02" corresponding to "around Osaka" can be set as a second area code.

In this embodiment, although a description has been given as performing narrowing on the basis of the area, the preference of the user may be estimated on the basis of the customer history information 166; for example, for the purchase of music CDs, when the frequency of purchasing a "new release" is high, a code corresponding to this, and when the frequency of purchasing an "old release" is high, a code corresponding to this, may be registered as related provided information; and narrowing may be performed based on this additional information.

[Log-in Process]

Figure 16:
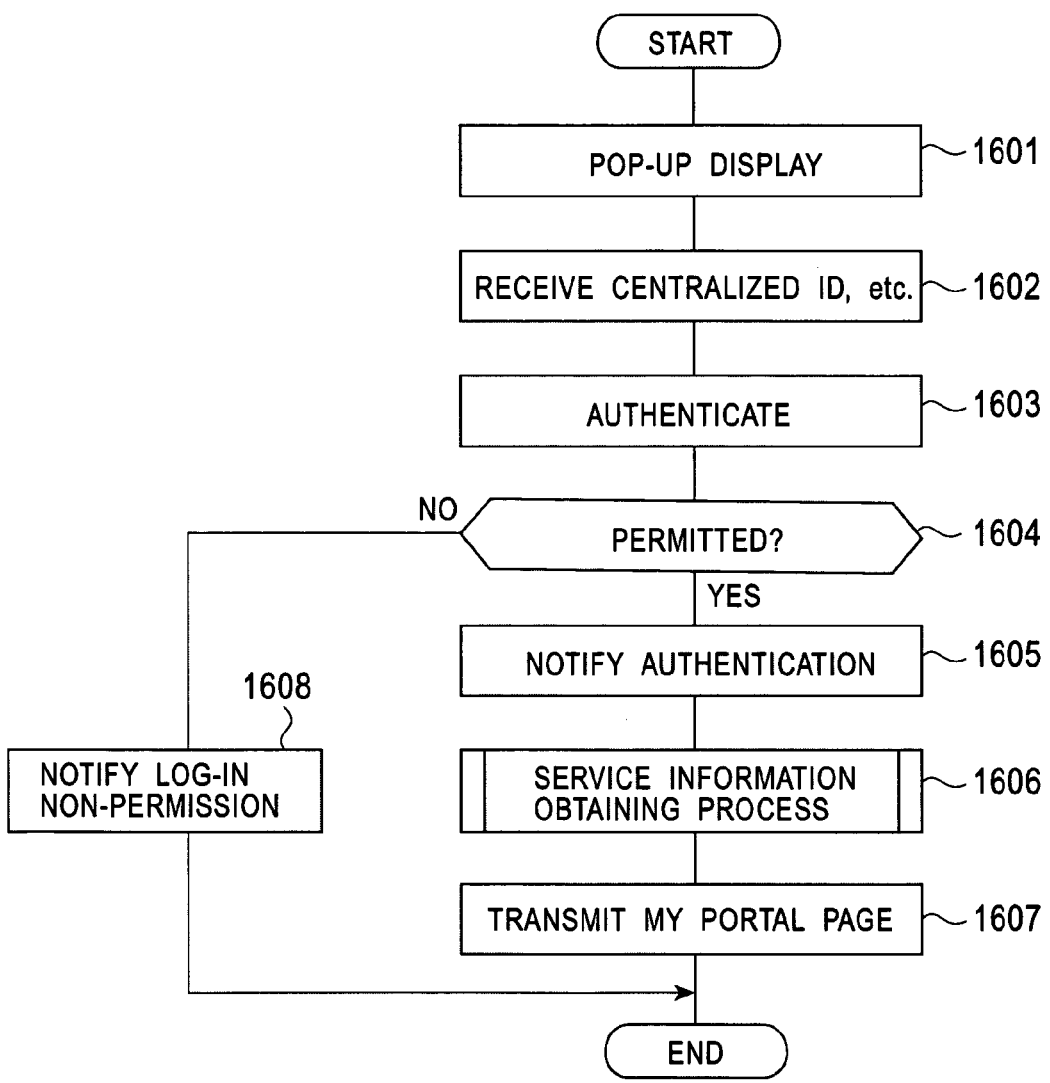
FIG. 16 is a flowchart showing a log-in process according to the embodiment of the present invention.

FIG. 16 is a flowchart showing a log-in process to be performed by this service.

At the top page, when "log-in" is selected by the customer, a log-in process is started. First, in order to obtain information for authenticating the customer, the control means 112 transmits the files (files written by hypertext, image files, etc.) for making a pop-up display shown in FIG. 9A to the display device of the customer terminal 200 via the transmission means 116 (step 1601).

When the customer holds up the IC card 260 to the card reader included in the customer terminal 200 in accordance with the screen display, information containing the centralized ID which is electronically recorded on the IC card 260 is read, information containing the centralized ID is transmitted, and so the control means 112 received this information (step 1602).

Next, by referring to the customer database 160, a determination is made as to whether or not the customer is a properly registered person in order to receive this portal service on the basis of the customer database 160 (steps 1603 and 1604). When it is determined in step S1604 that the customer is a properly registered person, this fact is notified to the individual server 240 (step 1605), and a service information obtaining process is performed (step 1606).

When it is determined in step S1604 that the customer is not a properly registered person, a file for displaying a message indicating the non-permission of a log-in is sent to the customer terminal 200 (step 1608).

A service information obtaining process will now be described with reference to the flowchart shown in FIG. 17A. Initially, the control means 112 extracts the service ID from the related provided information 170 for the customer of the customer database 160 via the information extraction means 126 (step 1701). Next, an inquiry is made to the individual server 240 which provides services related to the service ID via the service information obtaining means 128 so as to promote the transfer of the service information corresponding to the service ID (step 1702). The individual server 240 has a database formed of service information or a URL having the service information stored therein in such a manner as to correspond to a plurality of service IDs for the services provided by the individual server 240 itself. Since the individual server 240 receiving an inquiry transmits the corresponding service information, the control means 112 receives this service information via the service information obtaining means 128 (step 1703).

Next, the control means 112 instructs the narrowing means 130 to narrow the obtained service information. The narrowing means 130 obtains the area code which is set to correspond to each service ID from the related provided information 170 of that customer, and performs a narrowing process to reduce the service information which does not correspond, sent from the individual server, on the basis of the area code (step 1704).

When obtaining the service information from each individual server 240 via the service information obtaining means 128, the area code is also added to the service ID, and the whole is sent as the service ID to each individual server 240, so that the transfer of only the corresponding service information from each individual server, that is, the service information after the narrowing is performed, may be received.

Figure 17B:
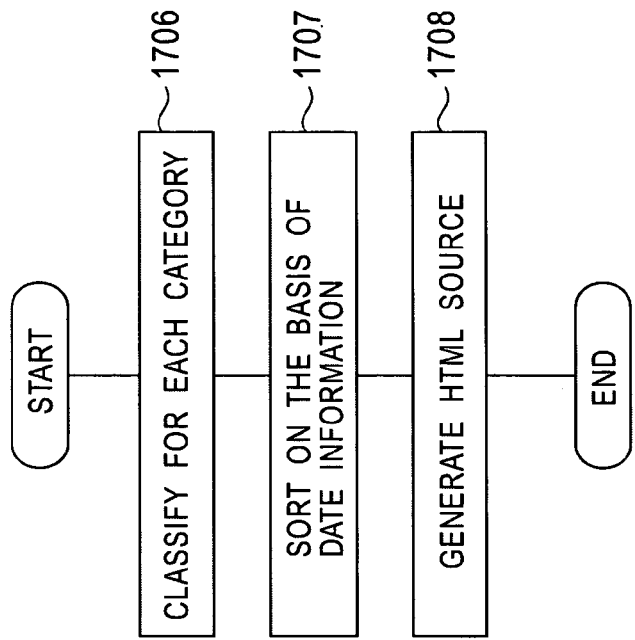
FIG. 17B is a flowchart showing a my-portal-page generation process.

Next, the control means 112 instructs the distribution information forming means 132 to generate a my portal page for the customer (step 1705). The process for generating the my portal page is shown in FIG. 17B. More specifically, the distribution information forming means 132 classifies the service information after being selected for each category (step 1706), sorts them on the basis of the date (step 1707), and generates HTML source files (files written by hypertext, image files, etc.) for displaying the my portal page whose screen image is shown in FIG. 10 (step 1708).

Referring back to FIG. 16, the files related to the my portal page for that customer, generated by the distribution information forming means 132, are transmitted by the control means 112 to the customer terminal 200 via the transmission means 116 (step 1607).

Figure 10:
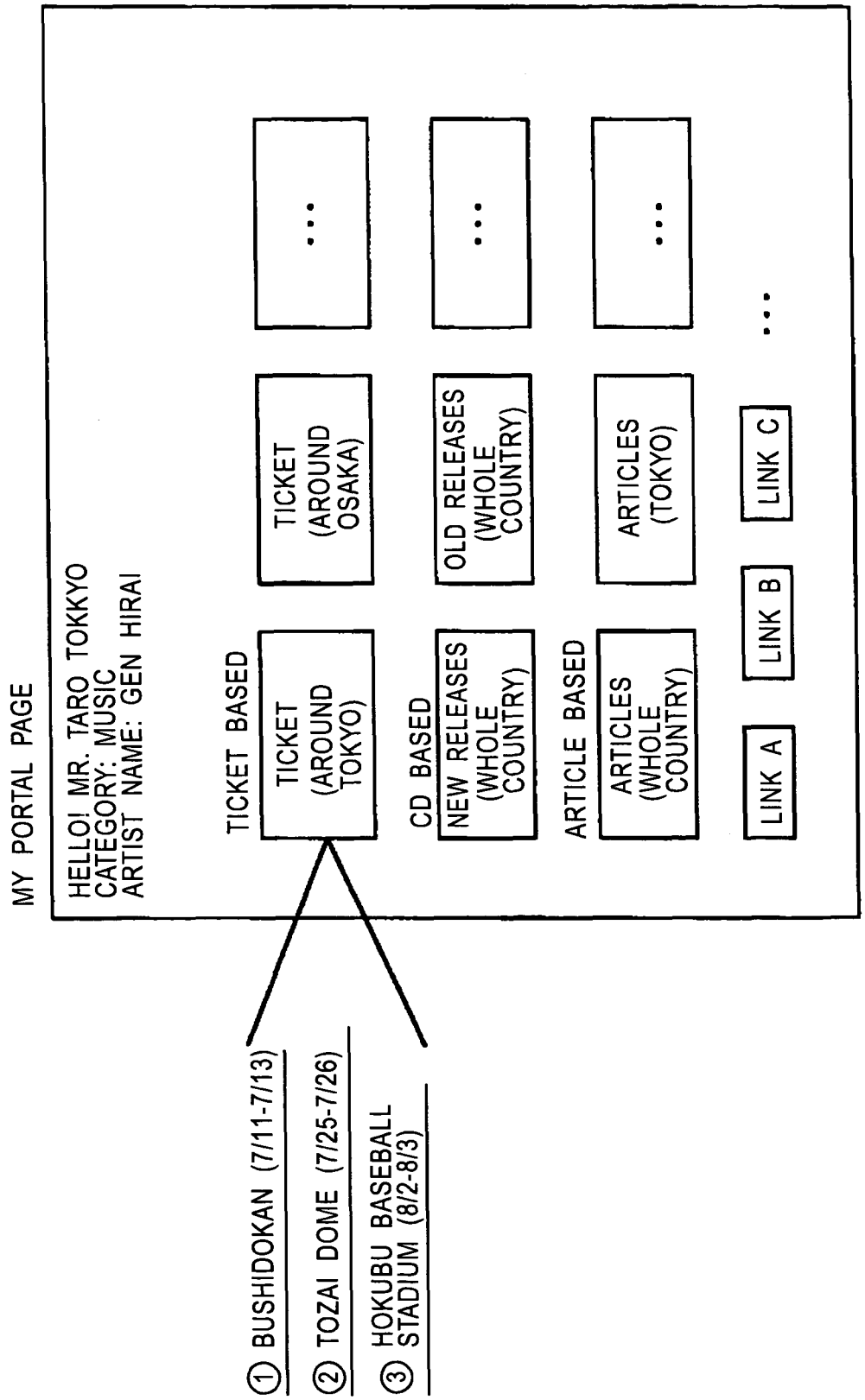
FIG. 10 shows an example of a screen image of a my portal page displayed on the customer terminal according to the embodiment of the present invention.

As a result, in the browser window of the display device of the customer terminal 200, a my portal page shown in FIG. 10 is displayed.

More specifically, after the greeting message for the customer, displays are provided as category "music" and artist "Gen HIRAI", and below them, for "ticket based", "CD based", and "article based", information corresponding to each of them is displayed. Below them, a link to each individual server 240 is displayed.

The "ticket based" is a column in which ticket information (the site of the concert, the period of the concert, the status of remaining seats, etc.) of the concert of "Gen HIRAI" is displayed. Since the customer of this embodiment lives in Tokyo, ticket information around Tokyo is displayed, and, since the customer purchased a ticket of a concert held in Osaka in the past, the ticket information around Osaka is also displayed. For example, for the ticket information around Tokyo, as shown in FIG. 10, displays are provided as (1) Bushidokan (7/11-7/13), (2) Tozai dome (7/25-7/26), and (3) Hokubu baseball stadium (8/2-8/3). These displays are formed as hyperlinks like, for example, "www.abc.co.jp/ticket/cgi?=tokyo+hiraigen+date". By clicking the item for which the customer wants to purchase, a jump is made to the ticket purchase site managed by the individual corporation which sells tickets, and the ticket can be purchased in accordance with the normal procedure (step 1107 in FIG. 11).

The "CD based" indicates information of musical pieces of "Gen HIRAI", and here, a display is made as being separated as "new releases" and "old releases". The "article based" indicates news related to "Gen HIRAI", gossip, information of a meeting of fans, and information of an official site of "Gen HIRAI", and here, a display is provided as being separated as "whole country" and "Tokyo". These displays are formed as hyperlinks in a manner similar to the "ticket based".

In this embodiment, in step 1604 in FIG. 16, when the customer is successful in a log-in to this portal site, this fact is notified to the corresponding individual server (site managed by the individual corporation). Therefore, when a jump is made to the ticket purchase site, there is no need to receive authentication again at that ticket purchase site. Also, when a jump is made to the corresponding site via the link button of the my portal page, provision of services by that site can be received without receiving the authentication again in a similar manner, and the effort of the customer and the burden on the individual server can be reduced. Furthermore, by the customer clicking the hyperlink displayed in the my portal page without notifying in step 1605 that the customer has been authenticated, a notification may be performed each time a jump is made to the corresponding individual server.

In this embodiment, the IC card 260 having recorded the centralized ID thereon is issued to the customer, the information containing the centralized ID is read by the card reader 210 included in the customer terminal, and this information is sent to the portal server, thereby performing the authentication of the customer. Alternatively, the centralized ID may be input from the customer terminal without issuing the IC card 260.

According to the above-described embodiments, since services provided by a plurality of individual corporations which provide different services by using a single IC card or a single centralized ID can be received, the management is very easy in comparison with that in which an ID or a card which is issued for each service providing corporation as in the conventional case is used.

Furthermore, it is possible for the customer to receive provision of information corresponding to the preference of the customer himself/herself among the information provided by each individual corporation by only accessing the portal site managed by the centralizing corporation. Moreover, if authentication is once received at the portal site, there is no need to receive authentication again at the site managed by each individual corporation. As a result, the convenience for the customer is improved, and an authentication process does not need to be performed again at each individual corporation, making it possible to reduce a processing burden on each individual corporation.

In addition, since information after narrowing is appropriately performed in accordance with the personal information (place where the customer lives, etc.) of the customer, the past transaction history, etc., is displayed in the my portal site of the customer, the history of transactions in the past, etc., cases in which information desired by the customer is buried in a large amount of information are reduced, and the service characteristics are high.

The embodiments which have been described in the foregoing are described to simplify the understanding of the present invention, and are not described to limit the present invention. Therefore, the components disclosed in the above-described embodiments are aimed to include all design changes and equivalents within the technical scope of the present invention.

In the foregoing, centralized identification information is recorded on a card. Alternatively, centralized identification information may be stored as cookie in a hard disk device of a computer of a user, or may be input by a user at each time of a log-in.

Figure 17A:
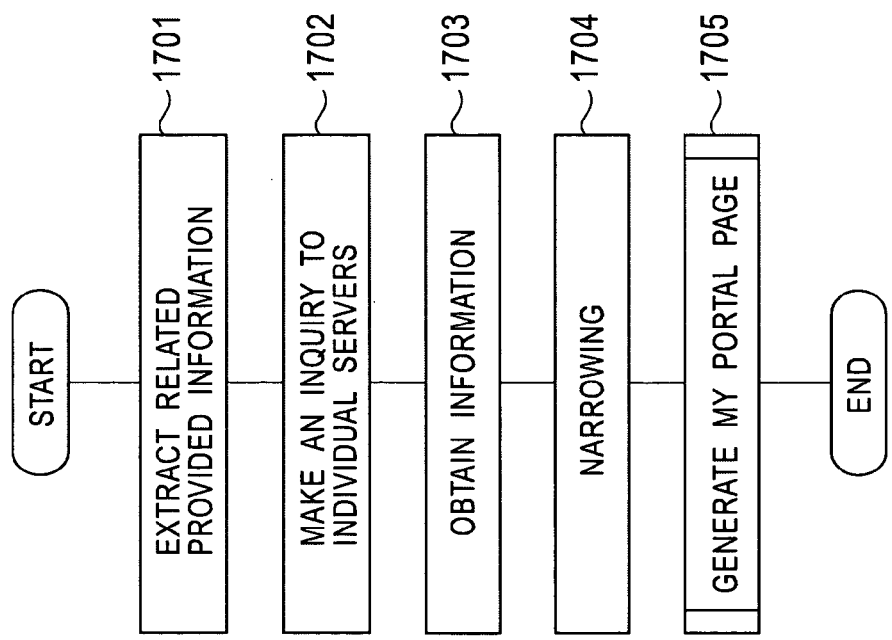
FIG. 17A is a flowchart showing a service information obtaining process according to the embodiment of the present invention.

In FIGS. 17A and 17B, a description is given in such a manner that information related to each individual server is acquired at the time of a log-in. Alternatively, information may be transmitted from each individual server each time the information is updated at the individual server or for each predetermined time/date, and based on the storage information of this server, the information to be displayed may be formed. In this case, the time from a log-in until the information is provided is shortened, and this is convenient for the user.

According to the present invention, there is an advantage that provision of services by a plurality of corporations can be received by using a single card or a single item of identification information.

There is another advantage that services provided by a plurality of corporations, which are related to each other, can be received with simple operation.

INDUSTRIAL APPLICABILITY

The present invention relates to an identification information centralizing method capable of using services provided by an individual corporation on the basis of a single item of centralized identification information in which individual identification information assigned by a plurality of individual corporations to corresponding customers is centralized, a portal information providing apparatus for providing portal information to a customer via a network by using the identification information centralizing method, and an IC card used when services are provided using the identification information centralizing method.

The invention claimed is:

1. A method for distributing service information from a computer apparatus of a first corporation to a terminal apparatus of a customer, the first corporation centralizing services provided by a plurality of corporations to the customer, the method comprising:

the computer apparatus assigning centralized identification information to the customer, the centralized identification information being registered in a database of the computer apparatus and recorded in an IC card issued to the customer;

the computer apparatus registering, in the database, individual identification information assigned by each of the corporations to the customer, and associating the individual identification information with the centralized identification information;

the computer apparatus receiving the centralized identification information recorded in the IC card through a card reader coupled to the terminal apparatus of the customer, thereby authenticating the customer, the card reader being contactlessly communicable with the IC card;

the computer apparatus registering, in the database, service identification information that identifies the services provided by the corporations, and associating the service identification information with the centralized identification information registered in the database;

the computer apparatus extracting service identification information from the database based on the centralized identification information;

the computer apparatus narrowing the extracted service identification information in accordance with an area code of the customer obtained on the basis of a purchase history of the customer;

the computer apparatus obtaining, from one or more of the corporations, service information corresponding to the narrowed service identification information; and the computer apparatus distributing the service information to the terminal apparatus of the customer, wherein the area code of the customer obtained on the basis of the purchase history is determined based on stored locations of prior transactions using the IC card with the card reader, and wherein the prior transactions of the purchase history of the customer are stored in sequence based on time of purchase, and when the stored purchase history of the customer exceeds a predetermined number of transactions or a predetermined period of time has passed since purchase, older transactions of the purchase history are deleted in sequence starting with an oldest transaction such that the location of each deleted transaction is no longer used to determine the area code of the customer.

2. The method according to claim 1, further comprising:

recording customer information of the customer, and associating the customer information with the centralized identification information;

selecting the service information obtained from the one or more of the corporations based on the customer information; and distributing the selected service information.

3. The method according to claim 2, wherein the customer information comprises at least one of area information including a location where the customer lives, and history information including the services previously received from the one or more of the corporations.

4. A method for distributing customized service information from a computer apparatus of a first corporation to a terminal apparatus of a customer via a network, using an IC card issued by the first corporation to the customer, the IC card recording centralized identification information assigned by the first corporation to the customer, wherein the first corporation centralizes services provided by a plurality of corporations to the customer, the method comprising:

registering, in a database of the computer apparatus, service identification information that identifies the services provided by the corporations, and associating the service identification information with the centralized identification information;

registering, in the database, individual identification information assigned by each of the corporations to the customer, and associating the individual identification information with the centralized identification information;

recording, in the database, personal information of the customer including an area code of the customer obtained on the basis of a purchase history of the customer, and associating the personal information of the customer with the centralized identification information;

receiving the centralized identification information recorded in the IC card by accessing the IC card using a card reader coupled to the terminal apparatus of the customer, thereby to authenticate the customer;

extracting service identification information from the database based on the centralized identification information;

retrieving service information from servers of the corporations in accordance with the extracted service identification information;

generating the customized service information by narrowing the service information in accordance with the personal information of the customer; and distributing the customized service information to the terminal apparatus of the customer, wherein the area code of the customer obtained on the basis of the purchase history is determined based on stored locations of prior transactions using the IC card with the card reader, and wherein the prior transactions are stored in sequence in the database based on time of purchase, and when the stored personal information of the customer exceeds a predetermined number of transactions or a predetermined period of time has passed since purchase, older items of the personal information are deleted in sequence starting with an oldest transaction such that the location of each deleted transaction is no longer used to determine the area code of the customer.

5. The method of claim 4, wherein receiving the centralized identification information comprises wirelessly accessing the IC card by the card reader.

6. The method according to claim 1, wherein the area code of the customer is further obtained on the basis of at least one of an address, a postal-code number, and a phone number of the customer.

7. The method according to claim 4, wherein the area code of the customer is further obtained on the basis of at least one of an address, a postal-code number, and a phone number of the customer.

8. The method according to claim 1, wherein the area code of the customer comprises a plurality of area codes obtained on the basis of statistical processing of the prior transactions of the purchase history.

9. The method according to claim 4, wherein the area code of the customer comprises a plurality of area codes obtained on the basis of statistical processing of the prior transactions of the purchase history.

* * * * *